United States Patent [19]

Gidge

[11] Patent Number: 5,375,402
[45] Date of Patent: Dec. 27, 1994

[54] CRANBERRY HARVESTING METHOD AND APPARATUS

[75] Inventor: Lester Gidge, Nashua, N.H.

[73] Assignee: Nashua Industrial Machine Corp., Nashua, N.H.

[21] Appl. No.: 937,420

[22] Filed: Aug. 31, 1992

Related U.S. Application Data

[63] Continuation-in-part of Ser. No. 888,481, May 27, 1992, abandoned.

[51] Int. Cl.$^5$ .................. A01D 46/00; A01D 46/24
[52] U.S. Cl. ........................ 56/328.1; 56/130; 56/330
[58] Field of Search ............... 56/130, 330, DIG. 10, 56/8, 9, 328.1

[56] References Cited

U.S. PATENT DOCUMENTS

| | | | |
|---|---|---|---|
| 1,533,644 | 4/1925 | Gebhardt | 56/330 |
| 2,372,821 | 4/1945 | Gathercoal | 56/130 |
| 2,671,301 | 3/1954 | Harrison | 56/330 |
| 2,696,706 | 12/1954 | Getsinger | 56/130 X |
| 3,475,889 | 11/1969 | Overstreet et al. | 56/328.1 |
| 3,616,630 | 11/1971 | Gray et al. | 56/330 |
| 3,845,610 | 11/1974 | Sharp et al. | 56/328.1 |
| 4,211,062 | 7/1980 | Sarig et al. | 56/328.1 |
| 4,982,559 | 1/1991 | Calais | 56/328.1 |
| 5,134,837 | 8/1992 | Casey et al. | 56/12.8 |
| 5,193,331 | 3/1993 | Quandt | 56/130 X |

FOREIGN PATENT DOCUMENTS

| | | | |
|---|---|---|---|
| 343880 | 11/1989 | European Pat. Off. | 56/330 |
| 1467562 | 3/1977 | United Kingdom . | |
| 1264864 | 10/1986 | U.S.S.R. | 56/328.1 |

*Primary Examiner*—David J. Bagnell
*Attorney, Agent, or Firm*—Fitzpatrick, Cella, Harper & Scinto

[57] ABSTRACT

An apparatus for harvesting a crop, such as cranberries, includes a frame movable through a field of plants, a revolvable surface carried by the movable structure and supported to revolve about a horizontal axis, and resilient, rubbery fingers mounted rigidly on the revolvable surface and projecting outwardly therefrom. The revolvable surface and fingers are arranged to bring the fingers into contact with the crop plants. In addition, a method for harvesting berries includes the steps of moving a frame through a field, revolving a drum on the frame in a forward direction about a horizontal axis, with the drum having a plurality of semi-rigid, rubbery fingers rigidly mounted thereon and projecting outwardly therefrom, such that as the revolving drum moves through the field, the fingers dislodge and sweep berries from plants onto an apron that leads to a conveyor or auger and to a container for further shipment.

34 Claims, 9 Drawing Sheets

CRANBERRY HARVESTING METHOD AND APPARATUS

BACKGROUND OF THE INVENTION

This is a continuation-in-part of my patent application Ser. No. 07/888,481, filed May 27, 1992 now abandoned.

FIELD OF THE INVENTION

This invention relates to harvesting crops. It is particularly useful for harvesting berries, and more particularly for harvesting berries such as cranberries that grow on low-lying plants. The apparatus and methods of this invention, however, may be used to harvest many kinds of crops, including vegetable, grain and fruit crops, particularly currants, blueberries and gooseberries.

DESCRIPTION OF THE PRIOR ART

Cranberries are a delicious fruit with many uses, and they produce high yields of over 20,000 pounds per acre. The cranberry, however, is particularly difficult to harvest. Cranberries grow on low-lying plants that creep along the ground like ivy and typically rise up only 3–5 inches. The stems tend to become entwined with each other to form a tangled mass appearing almost as a green carpet, flecked with red at harvest time. Complete recovery of a crop is made more difficult because many ripened berries fall or are knocked to the ground and become nestled underneath this mass.

Harvesting cranberries has therefore been a time-consuming and inefficient process. Hand-picking recovers berries in the best condition, but it is slow, back-breaking work. Most cranberries are "wet-harvested." In this technique a field of ripe cranberries is flooded to a depth of one to two feet. Loose berries float to the surface of the water and are skimmed-off. To improve the yield, a rotating device, known as a "reel," may be used to beat the bushes while the field is flooded and dislodge additional berries. Such reels, which look somewhat like steamboat paddle wheels but have rods instead of flat blades and are typically about 4 to 10 feet wide and about 18 inches in diameter, tend however to bruise and damage the berries, reducing their storage life and perhaps making them fit only for juice and other products where damage can be tolerated. Berries in perfect condition command up to a 40% price premium over damaged berries.

Some mechanical harvesting machines have also been used for harvesting, but they have been only marginally useful. Some of these machines are rake-like devices and others involve complicated mechanisms using a rotating wheel or chains that carry several geared or cammed containers having metal tines. The metal tines enter the plants generally rotationally and then lift up through the plants to strip and scoop the berries and move them to the base or rear of the tines, after which they are transferred to a conveyor and a final container. Such dry-harvesting machines, however, are complicated, unreliable, slow devices. Because they must operate close to the ground, and because the cranberry plants are so entangled, the metal tines often become permanently bent, break or snap-off in use. Another drawback is the virtual inability of such devices to collect berries that have fallen from the plants and lie on the ground.

Accordingly, improvements and advances in apparatus and methods for harvesting crops, particularly berries from low-lying plants and bushes are needed.

While the above description of the prior art and the following description of the invention will use cranberries as the primary example, the invention and its features may be used to harvest many other crops, including fruit, vegetable and grain crops, particularly other berry crops.

SUMMARY OF THE INVENTION

This invention quickly and efficiently harvests cranberries and other crops with minimum damage to the harvested crop and to the plants themselves.

The harvester of the present invention includes a movable frame and a revolvable surface which is carried by the movable frame and supported to revolve about a horizontal axis. Resilient, rubbery fingers are mounted rigidly on the revolvable surface and project outwardly, with the revolvable surface and the fingers being arranged for bringing the fingers into contact with the crop to be harvested, for example cranberries. A flexible apron may be positioned to guide berries or other crop that have been dislodged and swept by the fingers, and a crop collector may be positioned to collect the cranberries gathered by the sweeping motion of the flexible fingers through the cranberry plants.

The movable frame supports the revolving surface and is preferably pushed horizontally through the cranberry field by a primary mover such as a tractor. Alternatively, the frame may be self-propelled or pushed manually. We prefer a speed through the field of about 120 feet per minute, which is about 1.4 miles per hour. Depending on the terrain, this speed may range from zero up to 3 or 4 miles per hour, or even higher.

The revolvable surface may be a drum, a belt, or a series of panels carried by chains to form a belt-like surface. The revolvable surface is revolved or rotated so that the fingers dislodge and remove crop from the plants and sweep loosened crop in the desired direction, preferably toward an apron and a conveyor. The berries are removed from the plants either by the force of the sweeping action of fingers and the finger tips contacting the crop or by passage of a stem between adjacent fingers and stripping the crop. The revolvable surface may be adjusted to position the moving finger tips close to the ground to sweep loose berries off the ground, to provide an optimum distance between the flexible fingers and the crop and to accommodate varying topography. At the lowermost position of the fingers, the space between the ground and the finger tips is preferably less than one-half the diameter of the berries to be harvested. If the crop to be harvested appears on plants at some distance above the ground, the picking heads may be located at about the same distance above the ground as the crop. When the picking mechanism is not in use, it may be raised well above the ground, for example, for travelling on a road.

A movable structure or frame may support a plurality of such revolvable surfaces in a "ganged" arrangement, and each surface may be mounted on its own support structure, which together with the revolving surface forms a harvesting head. These heads may be supported independently of each other on a single moveable frame in order to accommodate uneven ground.

Each head may also be supported in part by one or more skids that are connected to the head and ride on the ground to help guide the revolvable surface at a predetermined distance above the ground. Each head is preferably also connected from above to the moveable support or frame. This connection, which may include an air piston or other adjustable device, carries most of the weight of the heads and maintains only a minimum weight of the heads on the skids. In this manner, the heads stay close to the ground but the skids do not dig into the ground or become caught easily on bumps or rocks and tend to ride lightly over uneven terrain.

To harvest berries or other crop, the revolvable surface is preferably rotated forward in the direction of motion of the machine. That is, the fingers that contact the crop sweep the crop forward in the direction of movement of the harvester.

As the harvesting heads rotate, the crop such as berries is not held against or carried by the revolvable surface but instead is swept, propelled, and/or thrown away from the revolvable surface and away from the bases of the fingers. This motion causes the berries to travel away from the tips of the fingers also, as they are thrown outwards by the motion and the resilient nature of the fingers.

An apron may be provided to direct the berries or other crop into a collector which may include a conveyor. The apron, the lower edge of which is preferably located above ground level approximately ¼ to ⅓ the minimum height of the plants to be harvested, provides a ramp to assist the crop onto the collector. Additional assistance may be provided by the leaves and stems of the plants, which tend to bend forward toward the apron as they are swept by the flexible fingers, forming a lower extension of the apron and helping the crop onto the apron and thence to the collector.

When the harvester is moving through a field to be harvested, the relative speed of the fingers against the crop is significantly faster than the speed of the frame of the harvester through the field. Each harvesting head preferably moves and rotates at a speed such that for every inch of crop traversed, the crop is swept by about one to four or more rows of fingers, and most preferably about two rows of fingers for every inch of linear travel. For example, if a harvester travels at a speed of 120 feet per minute, and its drum has twenty-four longitudinal rows of fingers and a rotation speed of 120 rpm, for every foot traveled, the drum makes one rotation, with twenty-four rows of fingers sweeping the ground; that is, every inch is swept by two rows of fingers.

Using cranberry plants as an example, a berry harvesting head of the present invention might use a drum with a diameter of 16 inches. For cranberry plants, drum diameters of anywhere from 10-24 inches are preferable. If fingers that are 3 inches long are used, the total diameter of each berry harvesting head to the tips of the fingers is 22 inches and the circumference is approximately six feet. At 120 rpm, the linear speed of the fingers relative to the axis of the drum is 720 feet per minute. Therefore, if the harvesting machine is being pushed at 120 feet per minute, the relative movement between the fingers and the cranberry plants is about 840 feet per minute. As other examples, a harvester moving at one mile per hour with a drum 1.3 feet in diameter revolving at 50 rpm would have a relative movement of about 300 feet per minute between finger tips and plants, and a harvester moving at 4 mph with a drum 2.5 feet in diameter revolving at 150 rpm would have a relative movement of about 1500 feet per minute.

The length, diameter, shape, orientation, spacing and resiliency of the fingers depends on the crop to be harvested. The resilient, flexible, rubbery fingers of this invention, which may be either hollow or solid, are preferably made of polyurethane elastomer or similar material, preferably a hard, rigid polyurethane elastomer and most preferably one having a Shure D (durometer) hardness of 50-90. This material has sufficient rigidity to remove or strip crops, but it does not bruise or damage the crop as metal or rigid fingers would.

The fingers are preferably mounted adjacent to each other in longitudinal rows generally parallel to the axis of the drum or other revolvable surface. The fingers are spaced apart from each other on the revolvable surface at distances that are about equal in the longitudinal direction to the minimum diameter of the crop to be harvested. The rows may be arranged in straight rows, parallel to the axis of the revolvable surface, in helical rows around the surface, or in groups of 4, 6 or 8 fingers in a row, with the groups arranged in staggered steps randomly or helically around the surface, or in other patterns. They are preferably spaced apart from each other in the circumferential direction by about the minimum distance of height of the crop to be harvested. In the case of cranberry plants, we prefer one row about every 15° around a drum.

The length of the fingers is about 50 to 125% as long as the minimum height of the crop to be harvested. In the case of cranberries, plants grow 3 to 5 inches above the ground, and the fingers are preferably 2-3 inches in length.

The flexible fingers are rigidly fixed at their bases to the revolvable surface and are positioned about the outside of the surface, projecting substantially perpendicular to the surface. While the fingers may have a slight curvature, they each have a general axis that lies within 30° of perpendicular to the revolvable surface or, more preferably, within 15° of the perpendicular.

The flexible fingers may have a substantially cylindrical shape with a circular cross-section having a diameter, for example, of ⅜ inch, and a rounded, blunt end. In an alternative embodiment, the fingers may have flat surfaces and taper at their distal ends to a point. Such fingers may have a trapezoidal-shaped cross-section, with the parallel surfaces being perpendicular to the direction of movement; the fingers are widest at the surface that initially contacts the crop. This shape improves stripping action of the fingers while reducing jamming of stems between the fingers. The fingers may also combine round and flat surfaces.

The machine of the invention may also include several inflexible, metal fingers interspersed randomly among the flexible fingers to disentangle and straighten stems as the surface rotates. These metal fingers also break off renegade and unwanted vines and the like that may be growing among the cranberries.

The harvester may include a primary collector positioned in front of the revolving drum and a secondary conveyor. The primary conveyor receives cranberries that have been propelled forwardly by the sweeping action of the fingers and conveys the berries by a conveyor belt, an auger helical device, or the like, moving transverse to the direction of the harvester and onto a secondary conveyor. The secondary conveyor may deliver the berries to a storage container. A plurality of disentangling tines may be spaced along the front of the primary conveyor to disentangle and straighten the stems of the cranberry plants as the harvesting machine traverses the field. The secondary conveyor may use air, either suction or blown, to deliver the berries to a container.

A berry harvesting head in accordance with the subject invention can also be used in deep wet-harvesting. The rotation and the fingers of the berry harvesting heads remove berries from the plants with reduced bruising or other damaging of the berries, allowing them to float to the surface in good condition where they may be skimmed off. The heads of this invention may also be used for shallow, semi-wet harvesting, in which the cranberry plants are partially or just barely covered with water.

A feature of this invention is a plant stabilizer. The plant stabilizer may be a bar, a roller or an equivalent device located beneath and close behind the revolvable surface or other harvesting device, such as the picking head described in my copending application, Blueberry Harvesting Apparatus, Ser. No. 07/888,481, filed May 27, 1992, incorporated herein by reference. The plant stabilizer contacts or is near the ground and may support a portion of the weight of the harvesting device. The stabilizer, which can be supported on the frame of the harvesting machine, extends across the path of the harvesting device and bears on the base of the plants while the crop is being stripped or swept and resists the stripping or sweeping forces on the plant. This tends to hold the plants in the ground during harvesting, which reduces uprooting and plant damage.

This invention also includes methods for harvesting. These methods may comprise the steps of moving a frame through a field, revolving a drum or belt on the frame in a forward direction about a horizontal axis, the drum or belt having a plurality of semi-rigid, rubbery fingers rigidly mounted thereon and projecting outwardly therefrom. These fingers dislodge, sweep, and throw berries forward from bushes as the revolving drum or belt moves through the field.

In a preferred process of the invention, rubbery fingers mounted on a rotatable surface move through a field of berries. The fingers may project outwardly from the rotatable surface to dislodge and sweep berries from bushes with the flexible fingers, and the berries may be directed to a berry conveyor mounted forward of the rotatable surface and conveyed to a berry container. The height of the rotatable surface and the flexible fingers from the ground can be adjusted to achieve an optimum height for harvesting the berries.

The drum or belt revolves at a speed such that two rows of fingers sweep the crop for every inch travelled by the frame. The drum or belt preferably revolves in a forward direction with respect to its location closest to the ground. An apron may be used which passes against and over the tops of the plants ahead of the drum. The fingers sweep upwardly from the lower part of the cranberry or other crop plants to dislodge or strip the cranberries or other crop from the plants and propel or throw them forwardly onto the apron and preferably onto a conveyor, an auger, or the like. The conveyor or other such device may convey the berries in a direction transverse to the direction of movement of the frame.

These and other aspects, features and advantages of the present invention will become apparent from the following detailed description of the preferred embodiments, taken in conjunction with the drawings, which again use cranberries as a prime example but may be used with other crops, preferably other berry crops.

DESCRIPTION OF THE PREFERRED EMBODIMENTS

Figure 1:
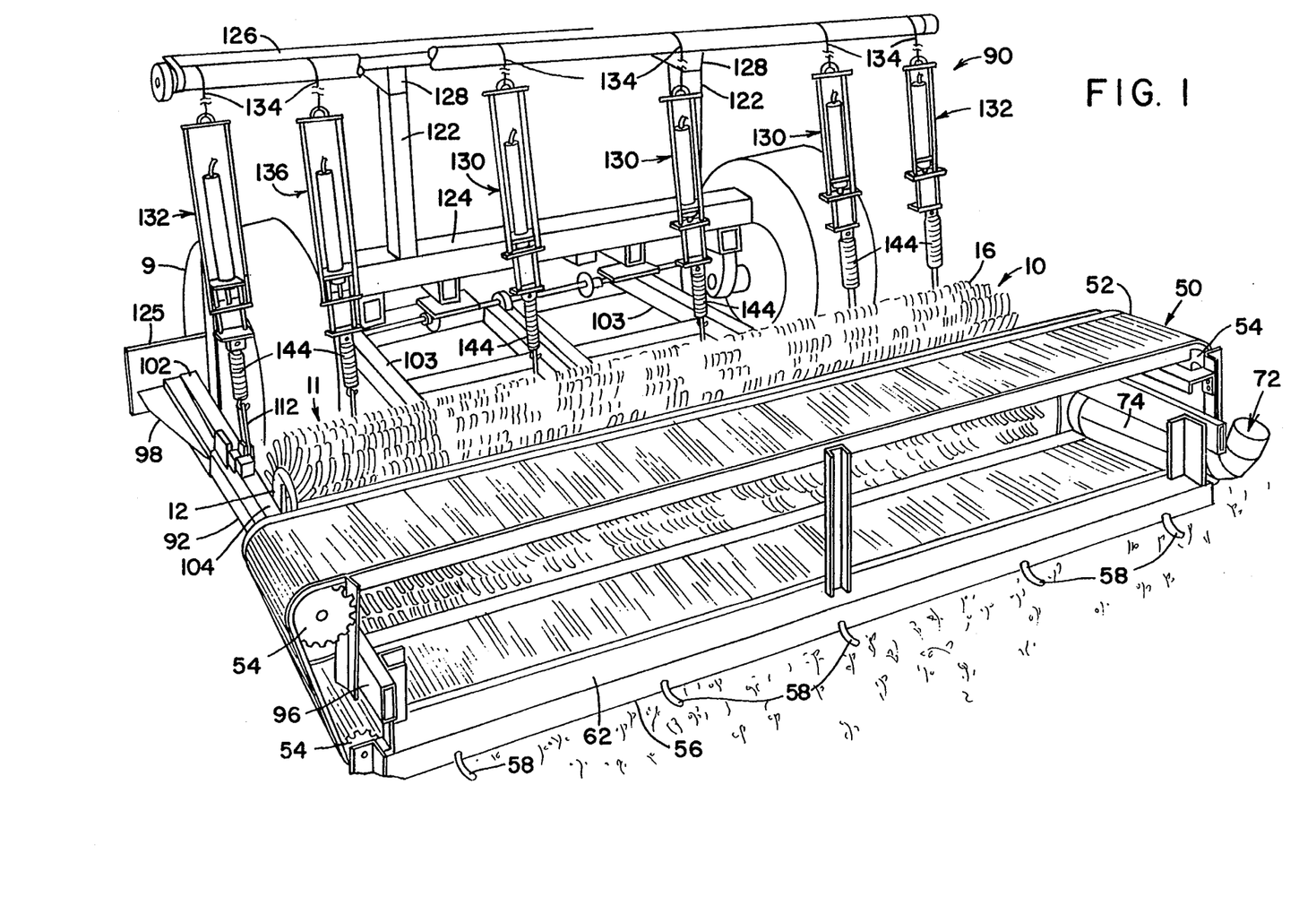
FIG. 1 is a front perspective view of a berry harvesting machine in accordance with the present invention.

A berry harvesting embodiment of the present invention appears generally in FIG. 1, which shows a berry harvesting mechanism 10, a primary conveyor 50, positioned in front of the harvesting mechanism 10, and a supporting structure 90. The supporting structure 90 supports the mechanism 10 and the primary conveyor 50 in front of a primary mover, such as a tractor or an all-terrain vehicle, two wheels 9 of which are shown, for pushing the berry harvesting machine through the field. The harvested berries may be conveyed by the primary conveyor to a secondary conveyor located at one side of the machine for delivery to a berry container.

The berry harvesting mechanism 10 includes four berry harvesting heads 11. Each head 11 includes a revolvable drum 12 bearing a plurality of outwardly projecting flexible, resilient fingers 16 disposed in lateral rows, with several rows located about the circumference of the drums 12.

Figure 8:
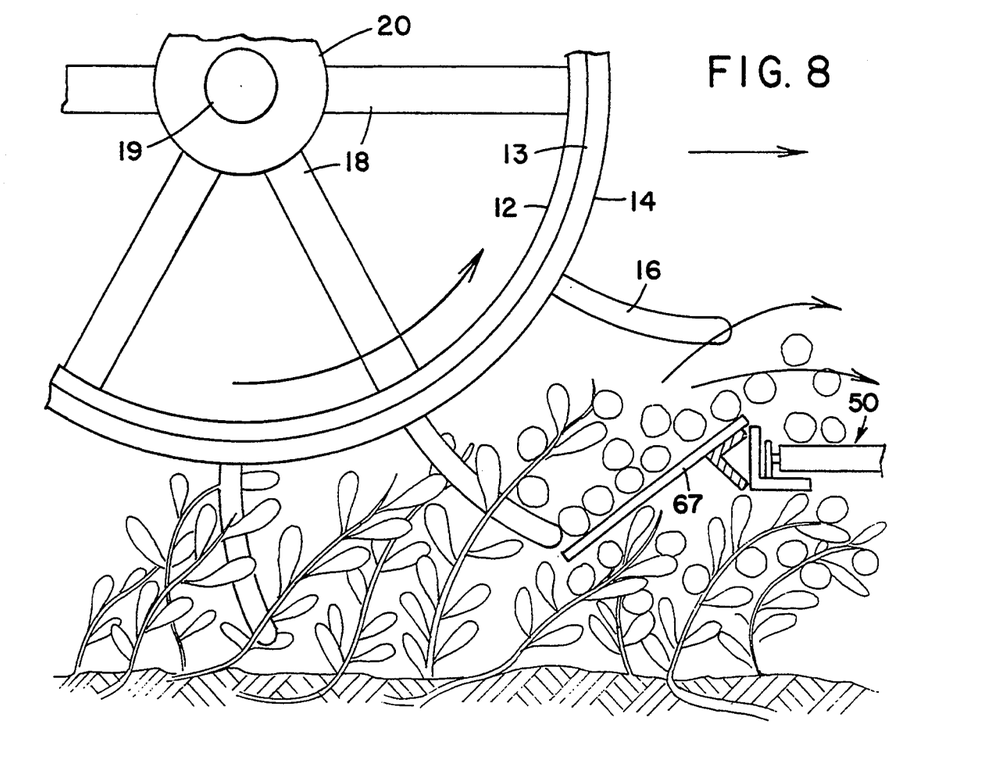
FIG. 8 is a side elevational view of a berry collecting head stripping and collecting berries in accordance with the present invention.
Figure 9:
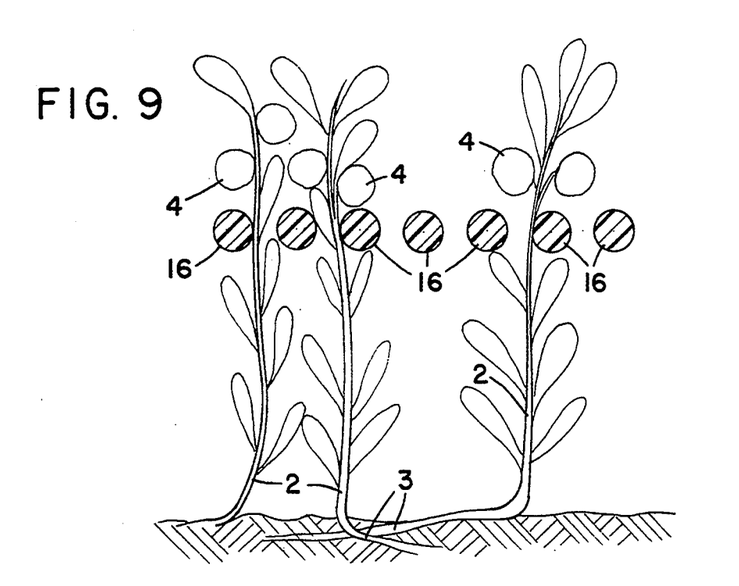
FIG. 9 is a side elevational view of cranberry bushes of the type harvested by the berry harvesting machine in accordance with the present invention.

In operation, rotation of the drums causes the fingers to dislodge berries from plants and sweep them into the conveyor 50, as shown in detail in FIGS. 8 and 9, in which the berries are designated 4; the stems, 1; and the undergrowth of entangled stems and roots, 3.

The primary conveyor 50 includes a frame 56 which supports roller gears 54 and endless conveyor 52. The belt is preferably a rod-type conveyor belt, which permits dirt and other debris to fall through. Disentangling tines 58 spaced along the lower front portion of the conveyor frame 56 help disentangle the plants and allow the revolving flexible fingers to make their way through the plants with less difficulty. The tines 58, which may be ¼ inch in diameter with distal ends approximately ½ to 1 inch above the ground, "comb" the plants in the same direction as the movement of the harvesting machine. Although FIG. 1 shows an open space at the front of the frame 56, this space is preferably closed by plexiglass or other means for preventing the picked berries from being propelled past the rod-type conveyor and out through the front of the cage. The conveyor 50 delivers the berries to one end of the machine, where they tumble into a berry receiving tube 74. An air intake tube 72 positioned at the right side of the primary conveyor directs air into tube 74 and comprises part of a secondary conveyor, which is discussed below.

The supporting structure 90 is made of hollow stock and angle bar of metal and metal alloys for strength. The hollow stock and angle bar are connected to each other in conventional ways such as by welding and bolting. Preferably, the supporting structure is secured to the front of the tractor or other primary mover in a conventional manner and pushed through the berry fields.

FIG. 1 shows horizontal support 126 for adjustably supporting the berry harvesting heads 11. The horizontal bar 126 connects to horizontal cross-bar 124 by vertical risers 122 and horizontal connectors 128. Cross-bar 124 is mounted on wheels 9 of the primary mover. Wires 134 from horizontal bar 126 connect to four adjustable interior pistons 130, one for each berry harvesting head 11, and two adjustable outer pistons 132, one for each side of conveyor 50.

The pistons 130 suspend head support frames 103, one for each head 11. The support frames are also pivotably connected at hitching bar 125. The pistons 132 support conveyor 50 and connect to arm support 104 and lateral supports 102, which at their rearward ends also connect to hitching bar 125. The primary conveyor 50 is supported by conveyor support bars 96, connected to side supporting bars 92 through an extension 94 (see FIG. 2). A flange 98 connects to side supporting bar 92 and the hitching bar 125 for additional support.

Figure 2:
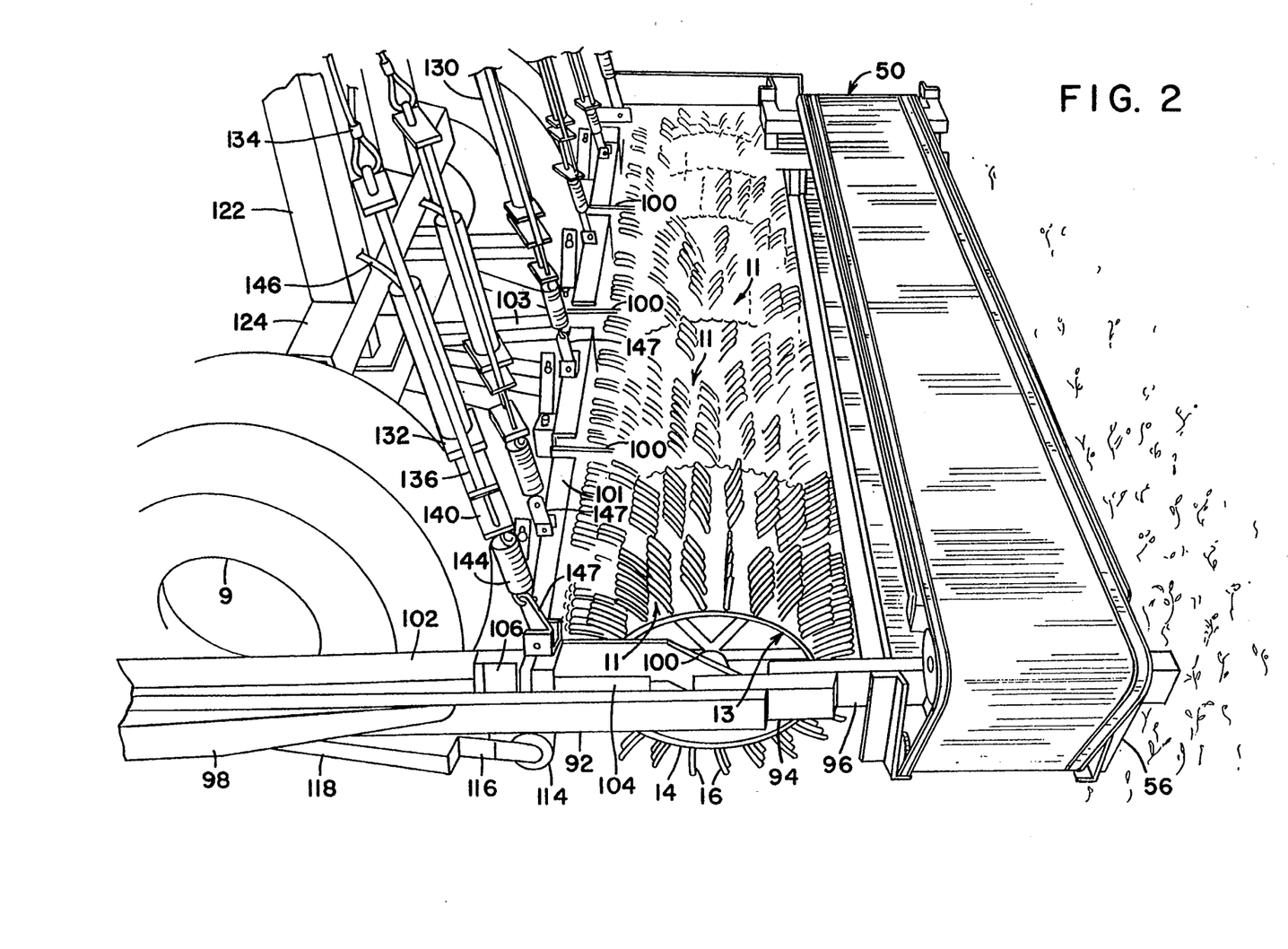
FIG. 2 is a side perspective view of the berry harvesting machine in accordance with the present invention.

FIG. 2, a side view in perspective, shows further detail about the independent suspension of the four heads 11 on respective pistons 130 and the suspension of the conveyor 50 by bars 96, 94, 92 and pistons 132. The adjustable piston 130 comprises a piston housing 136 supporting an air piston 138. The piston is fixed at its lower end to sliding support 140, which includes upper plate 141, lower plate 143 and connecting legs 145. The upper plate is connected to the piston and the lower plate is connected to spring 144. Each spring is connected to a support arm 147 secured to the horizontal bars 101. The piston is connected by an air hose 146 to an unshown source of air pressure. Although FIG. 2 shows four berry harvesting heads 11, that number may vary without departing from the scope of the invention.

Figure 3:
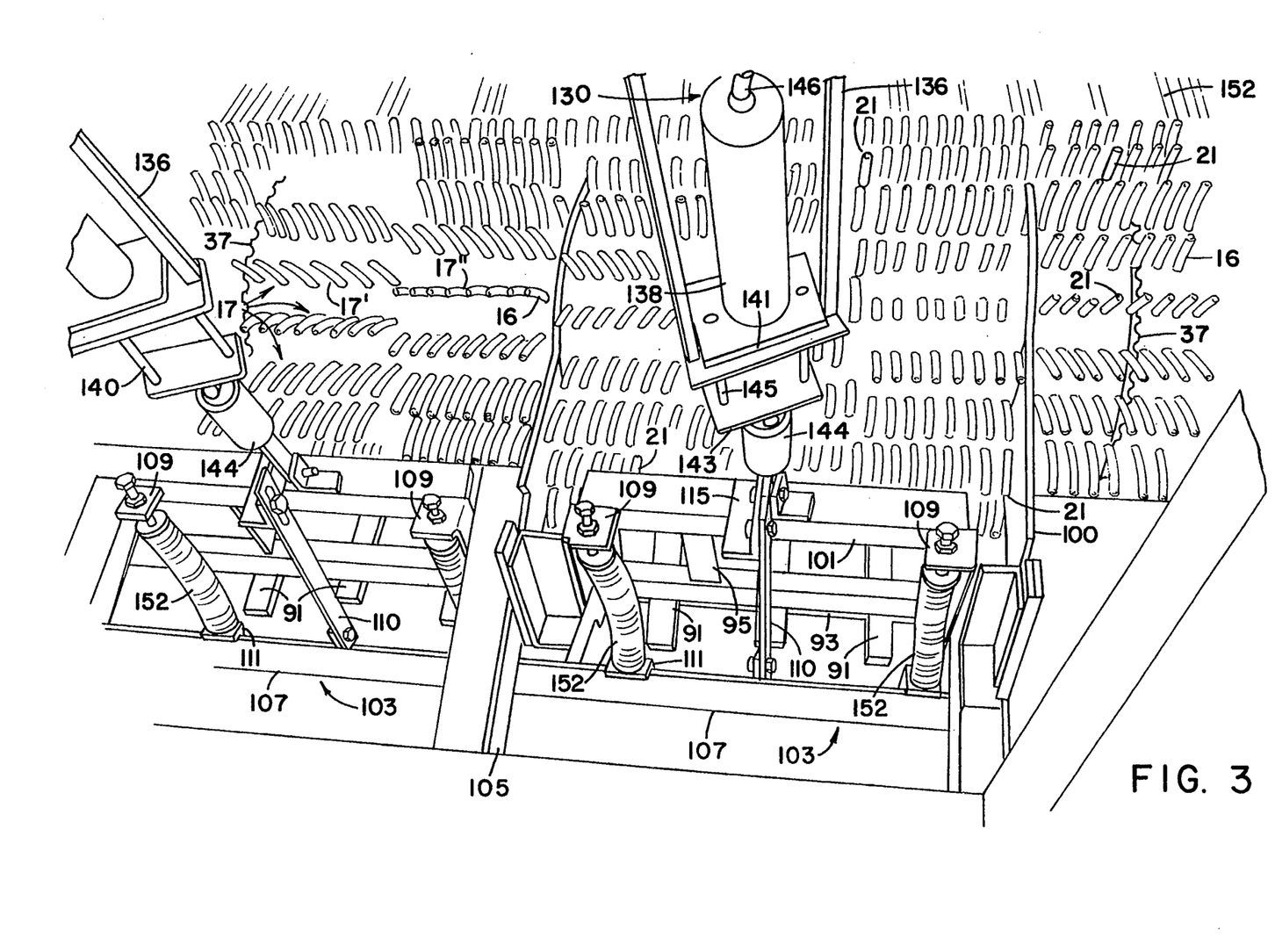
FIG. 3 is a top partial perspective view of the berry harvesting machine in accordance with the present invention.

FIG. 3 illustrates the rows of outwardly projecting fingers 16. In this embodiment each row 17 has offset portions, with each offset portion 17' and 17" containing, for example, 6–8 fingers. The spacing between adjacent fingers in each row is about ⅜ inch.

Figure 4:
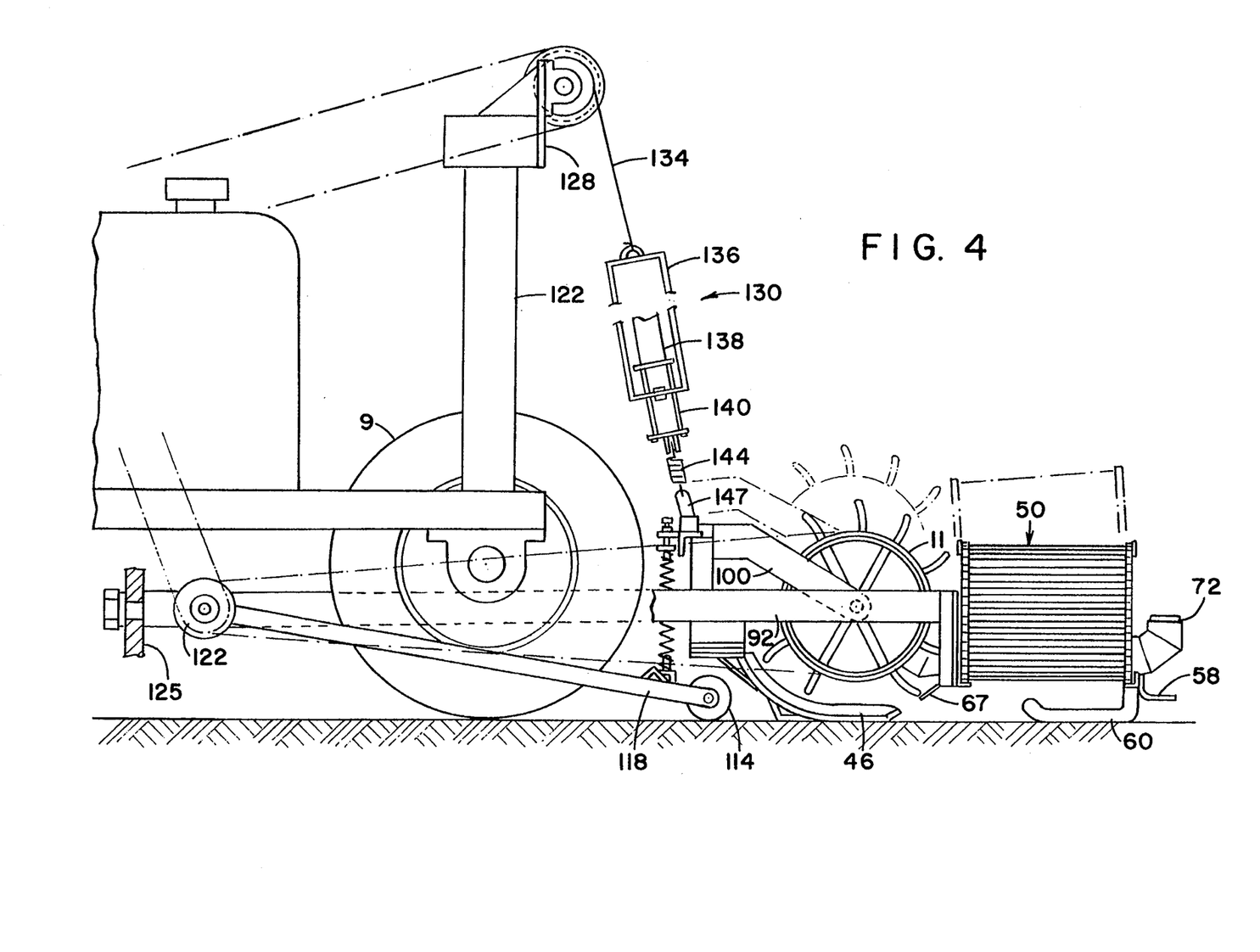
FIG. 4 is a side elevational view of the berry harvesting machine in accordance with the present invention.

FIG. 4 illustrates how the berry harvesting heads 11 and the primary conveyor 50 are supported above the ground. While the heads 11 are supported by pistons 130, runners 46 guide and also support the heads 11 at a uniform distance above the ground. Similarly, the primary conveyor, supported by conveyor support bar 96, is also supported a uniform distance above the ground by a plurality of skids 60 or equivalent types of supporting members. The skids are spaced laterally beneath the front portion of the primary conveyor.

While pistons 130, 132 provide support and may adjust the height for the heads 11 and the conveyor 50 during harvesting, heads 11 and conveyor 50 can also be lifted vertically by wires 134 well above the ground, as shown in phantom lines in FIG. 4, by pulling on, or winding, the wires 134. This permits easier travel on road-ways and the like.

Figure 5:
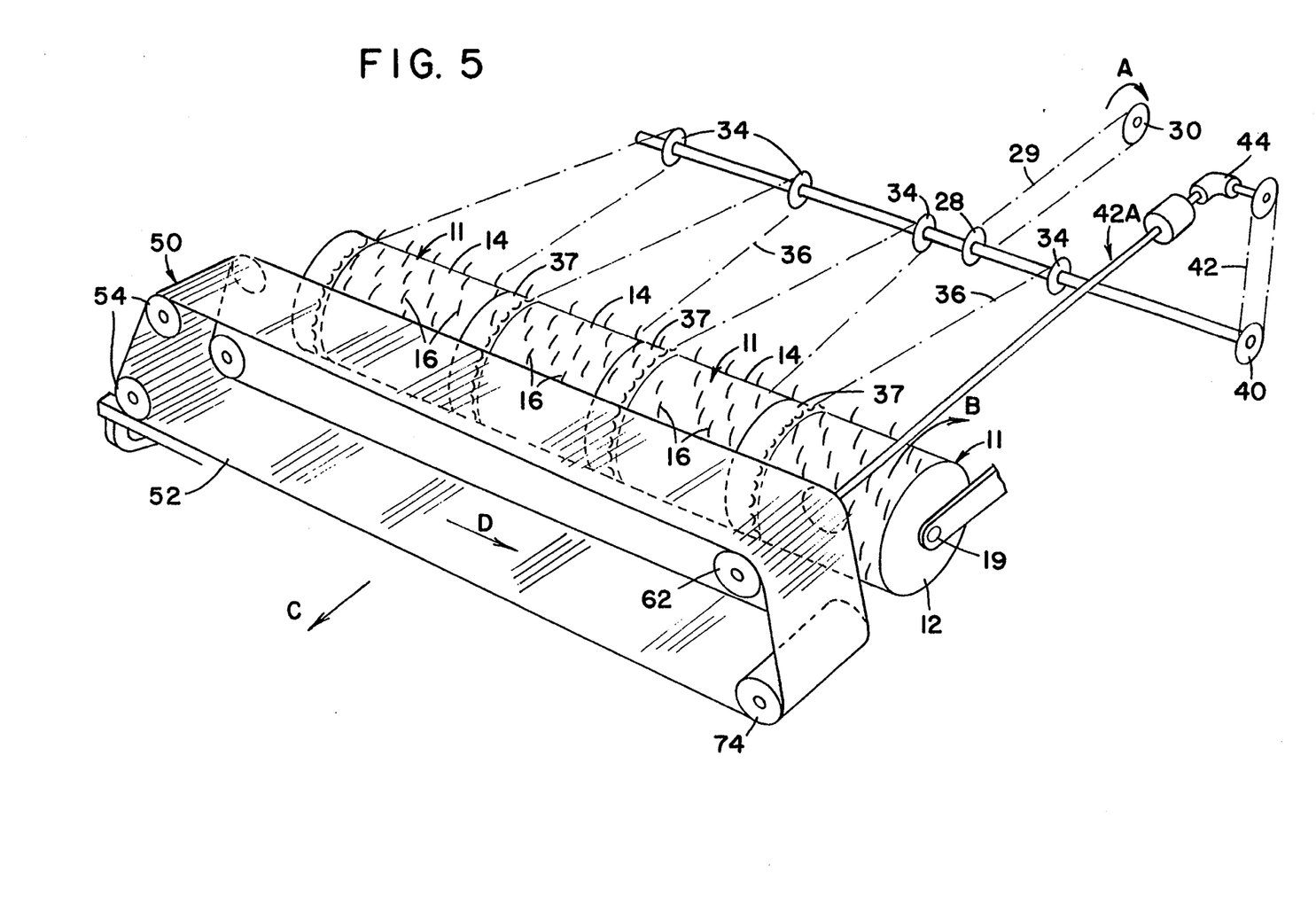
FIG. 5 is a schematic view of the power train, berry picking heads and a primary conveyor of the berry harvesting machine in accordance with the present invention.

FIG. 5 schematically illustrates the drive and gearing mechanism for rotating the berry harvesting heads 11 and the conveyor 50. Axles 19 support rotatable drums 12. Main drive 30, rotated by a power source not shown, drives chain 29 to rotate sprocket 28 and power axle 26. Endless drive chains 36 connect between sprockets 34 secured on the power axle 26 and circumferential gears 37 on each drum 12. As the power axle 26 rotates, drive chains 36 rotate the berry harvesting heads. At one end of the power axle 26 a conveyor drive sprocket 40 provides power to drive the primary conveyor 50 through chain 42 and axel rod 42A, an extension of the axel of conveyor drive gear 62.

Main drive 30 turns in a clockwise direction, arrow A, and rotates power axle 26, sprockets 34 and ultimately drums 12 of the berry picking heads 11 in a clockwise direction (arrow B). As the berry harvesting machine is driven in the forward direction of arrow C, the portion of the drum closest to the ground, i.e., the bottom of the drum, rotates forwardly so the flexible fingers move in the same direction as the harvesting machine as they sweep through the bushes.

The endless conveyor 52 is driven in a direction of arrow D transverse to the direction of movement of the harvesting machine by conveyor drive roller 62. The conveyor drive chain 42 is connected between the primary conveyor drive sprocket 40 and right angle universal type drive gears 44. The gears 44 transfer rotary motion by means of axel rod 42A and conveyor drive gear 62 to drive endless conveyor 52 in the direction of arrow D.

Figure 6:
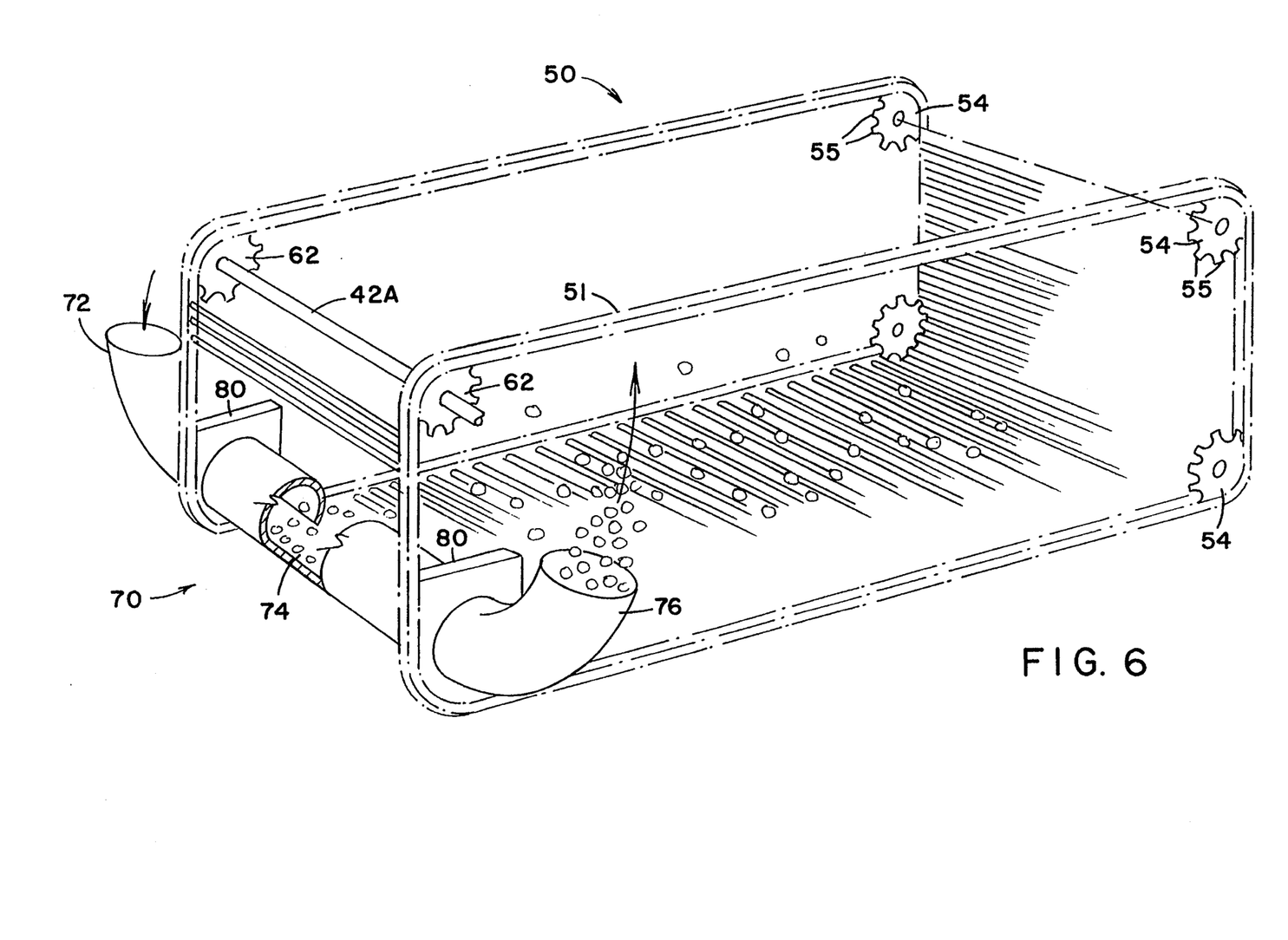
FIG. 6 is a perspective view of the primary conveyor and a secondary conveyor of the berry harvesting machine in accordance with the present invention.

As shown in FIG. 6, the endless conveyor 52 is supported at two corners by roller gears 54, at a third corner by drive gear 62, and at a fourth corner by corner supports 80. The conveyor drive roller 62 has gear teeth that engage chain-like edges 51 of the endless rod-like conveyor 52. Gear teeth 55 are similarly provided on roller gears 54. The primary conveyor 50 receives the berries picked and scooped by the berry harvesting heads and transports the berries to one side of the berry picking mechanism to a secondary conveyor 70.

FIG. 6 shows the secondary conveyor 70 positioned to receive the berries conveyed by endless conveyor 52. The secondary conveyor is supported by corner supports 80 within the frame 56. The secondary conveyor includes a berry receiving tube 74 connected on one end to an air intake tube 72 and the other end to a berry output tube 76. As the berry receiving tube receives berries from the endless conveyor, an unshown vacuum source draws air through the intake tube to create a vacuum in the berry receiving tube. The vacuum draws the berries into the berry receiving tube which leads to a box or other container (not shown) for receiving and storing the berries. As an alternative to the vacuum source, a blower can be used to blow air through the berry receiving tube.

Figure 7:
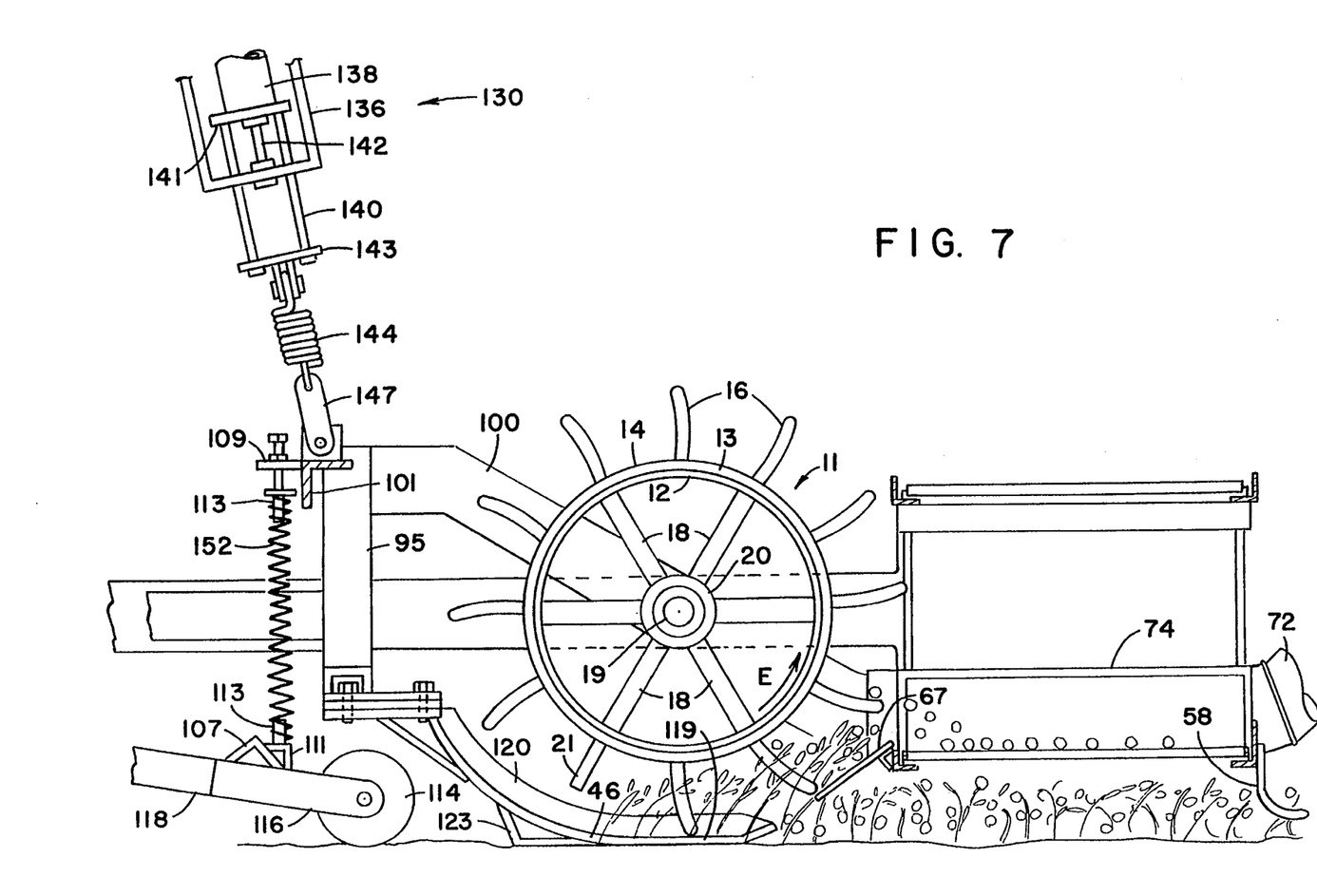
FIG. 7 is a side elevational view of the berry harvesting machine in accordance with the present invention.

FIG. 7 shows that each berry harvesting head 11 includes a rotatable drum 12 with a plurality of arcuate shells 13 affixed thereto. Each arcuate shell has a revolvable surface 14 with a plurality of flexible, slightly curved resilient fingers 16 projecting outwardly therefrom. Each of the arcuate shells 13 is mounted to the cylindrical drum 12 by flushly mounted or countersunk screws in a conventional manner. The shells 13 are thus readily removable from the drum 12 to allow replacement with shells bearing fingers 16 of different diameter and/or spacing between the fingers 16 in the event that berries of differing diameter, depending upon variety, etc., are to be picked. The shells 13 are also conveniently removable in the event that any of the fingers 16 are damaged and require replacement. In a preferred embodiment, six arcuate shells 13 are attached to the cylindrical drum 12. In this situation, each of the shells 13 subtend an arc of 60° on the drum 17. Fewer shells, for example 4, or a greater number of shells, for example 8, could be used. As an example, each of the arcuate shells 13 mounts twelve rows of the flexible fingers 16 with each row having eight fingers. The fingers can be secured to the shell by drilling an axial hole in their bases, inserting into holes in the arcuate shells that are the same size as the outside diameter of the finger, and inserting a pin, longer than the hole, into the hole from inside the drum.

Also as shown in FIG. 7, the harvesting machine includes a plant stabilizer in the form of roller 114 which extends approximately the width of one berry harvesting head 11. Alternatively, a single roller may extend the entire width of the berry harvesting mechanism. The stabilizing rollers are supported at their lateral ends by angle 116 (FIG. 2) and roller arm 118. Springs 152 supported between axial pins 113 extending from upper spring support 109 and lower spring support 111 apply downward pressure to the stabilizers 114. The upper spring support is secured to horizontal bar 101, and the lower spring support is secured to bar 107. Referring back to FIG. 3, the sliding bars 110 are connected between bar 107 and angle bars 115, which are secured to horizontal bars 101. Still with reference to FIG. 3, drum supporting arms 100 are connected to horizontal bars 101 and transverse supporting angles 105. The horizontal bars 101 connect to a parallel running bar 107 connected to plant stabilizer 114 by sliding bars 110. The sliding bars 110 have elongated slots 117 which define the limits of vertical movement of the stabilizer rollers 114 relative to the berry harvesting heads.

The stabilizers serve to hold the bases of the cranberry plants as the stems are being swept by the revolving fingers and prevent or reduce uprooting. Accordingly, the stabilizers are positioned close behind the berry harvesting heads.

Continuing with FIG. 7, each berry harvesting head 11 is supported by angled drum supporting arm 100. The supporting arms are connected at their proximal end to the support 103, see FIG. 3.

Referring to FIG. 7, pistons 130 operate as follows. Air is supplied to or withdrawn from the piston to slide cylinder 138 along post 142. As the cylinder slides axially along the post 142, the sliding support 140 slides with the piston to raise or lower shock absorbing springs 144, the horizontal bars 101 and drum arm supports 100. This action supports all or a portion of the weight of the berry picking heads 11 and positions them. The shock absorbing springs 144 flex to provide some cushion as the berry picking mechanism travels over the fields. The vertical adjustment is made based on factors such as the length of the fingers used on the harvesting heads and the height of the crop off the ground. Preferably, the berry harvesting heads are adjusted so the fingers come close enough to the ground to sweep loose berries off the ground, but the weight carried by the skids 46 is a minimum amount. In operation the skids 46 are kept in almost constant contact with the ground but carry only a small fraction of the weight of the heads 11.

FIG. 7 shows one of the metal tines 21, which are placed randomly on the berry harvesting heads 11 and are approximately ⅜ inch shorter than the length of the fingers 16. While the flexible tines 16 tend to comb the stems of plants to be harvested, disentangling them and straightening them in the direction of travel of the harvester, the metal tines 21 tend to break long, unwanted vines such as blackberry vines in cranberry fields. Such renegade vines, if unbroken, are so long and tough that they can snarl a cranberry harvesting machine. The shorter length of the tines 21 relative to the fingers 16 allows berries which come beneath the tines 21 to escape damage.

The runners 46 are connected to horizontal bar 101 by vertical connector 95. Each runner includes a curved flat portion 119 which rests along the ground and comes to a point at its leading end. A vertical portion 120 provides strength and extends upwardly from the flat portion and also comes to a point at its forward end. Angle bar 123 provides additional support for the runner as it is attached to the underside of flat portion 119 and also rests on the ground.

As shown in FIGS. 7 and 8, spokes 18 extend radially from a hub 20 and support the drum 12. Preferably, each head 11 has its own axle 19. The wall thickness of the cylindrical drum 12, approximately 4/10 inch, provides substantial rigidity and strength to the structure. The drum 12 and shells 13, also about 4/10 inch in thickness, are preferably formed of aluminum or similar light weight material.

The flexible fingers 16, about ⅜ inch in diameter and 2½" to 3" long, extend perpendicular to surface 14 in longitudinal rows about the entire circumference of the drum. The distal end of the fingers may be curved slightly in the direction of rotation, and a portion of the forward surface may be flat, to assist in propelling the berries forwardly in a manner described below. These fingers are solid cylinders of elastomeric polyurethane with rounded distal ends.

FIGS. 7 and 8 also show apron 67 for carrying berries onto the primary conveyor 50. The apron 67, which is attached to the rear side of the conveyor 50 and extends along its entire width, is preferably made of a combination of fabric and a rubbery material, similar to the combinations of materials used in conveyor belts. This provides sufficient strength and stiffness to assist the berries onto the conveyor, but also makes the apron flexible enough to be raised or flexed upwardly as the plants pass under it. The apron may, however, be made from other materials, for example from a thin, flexible plate of metal.

Figures 10, 11:
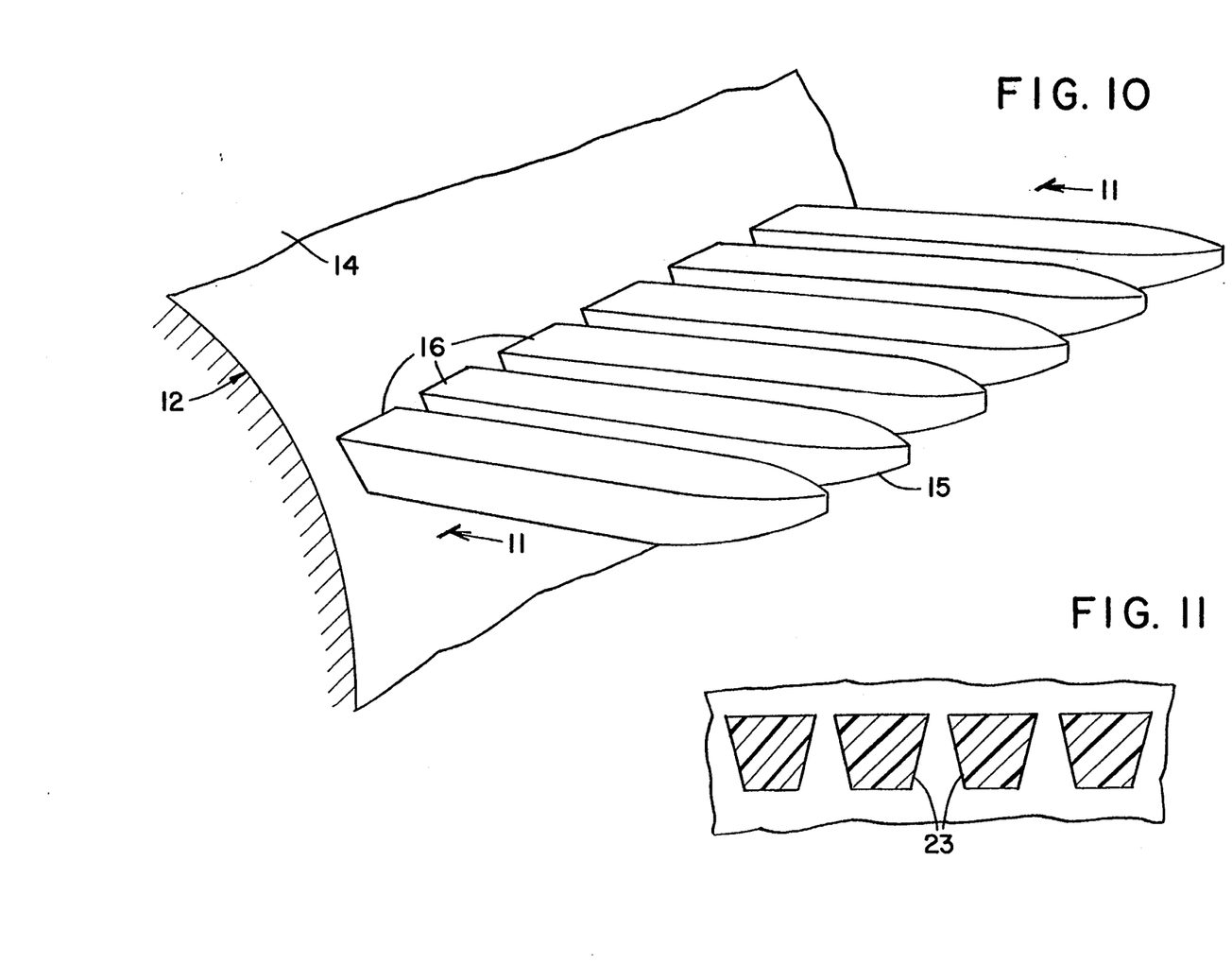
FIG. 10 is a partial perspective view of a berry picking head isolating a set of flexible rubber fingers in accordance with the present invention.
FIG. 11 is a cross-sectional view of the fingers in accordance with the present invention taken along lines 11—11 in FIG. 10.

FIG. 10 shows an alternate embodiment of fingers which may be used with the invention. These fingers have a trapezoidal cross-section, as shown in FIG. 11, and are shaped for stripping a crop. The sides 23 slope inwards to close the gap at the broad surface which contacts the crop first during the rotation of the drum. The narrow portion of the gap strips the crop, and jamming of stems is discouraged by the wider portions of the rest of the gap.

Although specific embodiments of the present invention have been described above in detail, it will be understood that this description is merely for purposes of illustration. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. An apparatus for harvesting cranberries from cranberry plants, comprising:
    a frame movable through a field of cranberry plants;
    a revolvable surface carried by the movable frame and supported to revolve about a horizontal axis;
    resilient, rubbery fingers that comprise a lengthwise portion consisting essentially of polyurethane mounted rigidly on the revolvable surface and projecting outwardly from the revolvable surface; and
    means for revolving the surface at a rate such that the fingers have a higher velocity relative to the cranberry plants than the movement of the frame through the field;
    the revolvable surface and the fingers being arranged for bringing the fingers into contact with the cranberry plants and sweeping cranberries from the plants.

2. An apparatus for harvesting cranberries from cranberry plants, comprising:
    a frame movable through a field of cranberry plants;
    a revolvable surface carried by the movable frame and supported to revolve about a horizontal axis;
    resilient, rubbery fingers mounted rigidly on the revolvable surface and projecting outwardly from the revolvable surface, with
    the revolvable surface and the fingers being arranged for bringing the fingers into contact with the cranberry plants; and
    a second, apron-like surface located ahead of the lowermost fingers as a ramp for collection of cranberries,
    the revolving surface, the fingers and the second surface being arranged for sweeping cranberries forward onto the second surface.

3. The apparatus of claim 2 in which the second surface is located above ground level at a distance which is about ¼ to ½ the minimum height of cranberry plants being harvested.

4. The apparatus of claim 2 including a structure disposed in front of the apparatus to disentangle plants.

5. The apparatus of claim 2 in which the frame supports a plurality of revolvable surfaces and including additional support structures to support each revolvable surface independently of the other revolvable surfaces.

6. The apparatus of claim 5 in which each revolvable surface has a respective supporting member to ride on the ground beneath the revolvable surface and assist in guiding the revolvable surface at an approximately uniform distance above the ground.

7. The apparatus of claim 6, wherein each revolvable surface includes at least one metal finger projecting outwardly from the revolvable surface to break long, unwanted vines.

8. The apparatus of claim 2 in which the revolving surface is a cylindrical drum supported to rotate about its central axis.

9. The apparatus of claim 2 which includes a conveyor mounted in front of the revolving surface to collect berries.

10. The apparatus of claim 9, wherein the conveyor includes an endless conveyor moving in a direction transverse to the direction of movement of the movable frame.

11. An apparatus for harvesting cranberries from cranberry plants, comprising:
    a frame movable through a field of cranberry plants;
    a revolvable surface carried by the movable frame and supported to revolve about a horizontal axis;
    resilient, rubbery fingers mounted rigidly on the revolvable surface and projecting outwardly from the revolvable surface, with
    the revolvable surface and the fingers being arranged for bringing the fingers into contact with the cranberry plants and a gearing mechanism to control the speed of the revolvable surface to move the tips of the fingers against the cranberry plants at a speed that is significantly faster than the speed of the frame through the field.

12. The apparatus of claim 11 in which the tips of the fingers are controlled to move at a speed such that every inch of the field to be harvested is swept by two or more rows of fingers, as the apparatus moves through the field.

13. The apparatus of claim 11 comprising in addition a supporting member to ride underneath the revolvable surface to assist in guiding the revolvable surface at an approximately uniform distance above the ground.

14. The apparatus of claim 11 in which the tips of the fingers are about as far apart in the circumferential direction as the minimum height of the cranberry plants to be harvested.

15. The apparatus of claim 11 in which the fingers are mounted in rows adjacent to each other and spaced apart from each other on the revolvable surface at distances that are about equal in the lateral direction to the minimum diameter of cranberries to be harvested.

16. The apparatus of claim 11 in which the fingers are about 50% to 125% as long as the minimum height of plants bearing cranberries to be harvested and are about equal in diameter to the minimum diameter of the cranberries to be harvested.

17. The apparatus of claim 11 including adjustable supporting means for maintaining the tips of the fingers at the lowest point in their revolving movement at a distance above the ground that is about less than the minimum diameter of cranberries to be harvested, and the revolving surface and the fingers are further arranged to bring the fingers into contact with cranberries resting on the ground.

18. The apparatus of claim 4 including a supporting member to ride near the ground in front of the apparatus and assist in supporting the apparatus over uneven terrain.

19. The apparatus of claim 11, wherein the rubbery fingers project outwardly substantially perpendicular to the revolvable surface.

20. A rotatable harvesting head for use in harvesting a crop, comprising:
    a rotatable surface having an approximately horizontal rotational axis, and fingers having elastomeric properties of polyurethane with a Shure D durometer rating of about 50 to 90 extending outwardly from the surface, the fingers (a) being rigidly mounted to the surface, (b) being spaced about as far apart in the lateral direction as the minimum dimension of the crop to be harvested and (c) having a width about as great as the minimum dimension of the crop to be harvested.

21. An apparatus for harvesting a crop from a field, comprising:

a frame;

moving means for propelling the frame through the field;

means for sweeping the crop from the field into a crop collector means, the sweeping means including revolving means mounted on the frame and a plurality of semi-rigid, flexible fingers mounted in rows adjacent to each other on the revolving means, adjacent fingers being laterally spaced from each other at substantially equal distances, with the distance between each finger being less than a minimum diameter of the crop to be harvested;

means for rotating the portion of the revolving means near the ground in the same direction as the movement of the frame through the field and at a higher velocity relative to the crop than the movement of the frame through the field; and a crop collector including an apron-like surface located ahead of the lowermost fingers as a ramp for collection of the crop, the revolving means, the fingers and the apron-like surface being arranged for sweeping the crop forward onto the apron-like surface.

22. An apparatus for harvesting berries from plants in a field, comprising:

a frame movable through the field of plants to be harvested;

berry picking means, supported on the frame, for picking the berries from the plants, the berry picking means including at least one rotatable drum having a plurality of semi-rigid, flexible finger means for sweeping the berries, the finger means projecting outwardly from the drum with adjacent finger means being laterally spaced from each other at substantially equal distances and the distance between each finger means being less than a minimum diameter of the crop to be harvested; and berry collecting means mounted forward of the berry picking means for receiving the berries picked by the berry picking means.

23. An apparatus according to claim 22, further comprising supporting means above the drum for adjustably supporting the berry picking means in the vertical direction and support means underneath the drum, wherein the supporting means above the drum can reduce the pressure of the support means below the drum on the ground.

24. An apparatus according to claim 23, wherein the berry collecting means includes a primary conveyor having an endless conveyor travelling in a direction transverse to the moving direction of the frame.

25. An apparatus according to claim 23, wherein the fingers can be adjusted by the supporting means to come within a distance from the ground of less than half the diameter of the berries to be harvested so as to scoop the berries off the ground.

26. An apparatus according to claim 25, wherein the fingers are disposed in substantially linear rows on the rotatable drum.

27. An apparatus according to claim 25, wherein the fingers are disposed in helical rows on the rotatable drum.

28. An apparatus according to claim 27, wherein the fingers are cylindrical in shape.

29. An apparatus according to claim 27, wherein the fingers have flat surfaces and a trapezoidal-shaped cross-section.

30. A process for wet-harvesting or semi wet-harvesting cranberries from a cranberry field comprising the steps of:

moving a frame through a flooded cranberry field;

revolving a drum or belt on the frame, the drum or belt having a plurality of semi-rigid, rubbery fingers having elastomeric properties of polyurethane with a Shure D durometer rating of about 50 to 90 rigidly mounted thereon and projecting outwardly therefrom, and the drum or belt moving the fingers at a velocity relative to cranberry plants in the field greater than the velocity of the frame through the field; and dislodging berries from plants with the fingers as the revolving drum or belt moves through the field.

31. A process for harvesting berries from plants with a machine having a movable frame supporting a rotatable surface, comprising the steps of:

rigidly mounting a plurality of flexible, rubbery fingers having elastomeric properties of polyurethane with a Shure D durometer rating of about 50 to 90 on the rotatable surface, with the fingers projecting outwardly therefrom;

adjusting the height of the rotatable surface and flexible fingers from the ground to achieve an optimum height for harvesting the berries;

moving the machine through a field to be harvested;

rotating the rotatable surface to dislodge and sweep the berries from bushes with the flexible fingers; and collecting the berries in a collector.

32. A process for harvesting a crop, comprising the steps of:

moving a frame through the crop to be harvested;

revolving a surface rigidly supporting a plurality of flexible rubbery fingers having elastomeric properties of polyurethane with a Shure D durometer rating of about 50 to 90 projecting outwardly therefrom in a forward direction;

dislodging and sweeping the crop from the plants with the revolving flexible fingers as the frame moves through the field onto an apron-like surface located ahead of the lowermost fingers as a ramp for collection of the crop, the revolving means, the fingers and the apron-like surface being arranged for sweeping the crop forward onto the apron-like surface.

33. A process according to claim 32, further comprising the step of propelling the crop from the fingers into a berry collector mounted forward of the revolving surface.

34. A process according to claim 33, further comprising the step of positioning the fingers in rows adjacent to each other on the revolving surface and laterally spacing adjacent fingers from each other at substantially equal distances, with the distance between each finger being less than a minimum diameter of the crop to be harvested.

* * * * *